United States Patent [19]

Duff

[11] E Patent Number: Re. 32,774

[45] Reissued Date of Patent: Nov. 1, 1988

[54] AXLE ALIGNMENT BUSHING

[76] Inventor: James M. Duff, P.O. Box 696, Sequim, Wash. 98382

[21] Appl. No.: 6,054

[22] Filed: Jan. 20, 1987

Related U.S. Patent Documents

Reissue of:

[64] Patent No.: 4,497,504
Issued: Feb. 5, 1985
Appl. No.: 494,651
Filed: May 16, 1983

[51] Int. Cl.[4] ..... B60G 3/00; B60G 25/00

[52] U.S. Cl. ..... 280/673; 280/716; 280/661; 384/263

[58] Field of Search ..... 280/688, 673, 661, 675, 280/725, 689, 701, 724, 716; 180/71, 73 R; 267/15 R, 20 A, 54 R; 384/276, 280, 294, 263, 397, 428

[56] References Cited

U.S. PATENT DOCUMENTS

| | | | |
|---|---|---|---|
| 2,859,058 | 11/1958 | Traugott | 280/661 |
| 2,991,087 | 7/1961 | Stanis | 280/661 |
| 3,163,441 | 12/1964 | Traugott | 280/661 |
| 3,493,222 | 2/1970 | Mathers et al. | 267/54 R |
| 4,168,086 | 9/1979 | Dick et al. | 280/725 |

*Primary Examiner*—Richard A. Bertsch
*Attorney, Agent, or Firm*—Ward Brown; Robert W. Beach

[57] ABSTRACT

A C-shaped bushing has a pair of spaced walls with inner and outer surfaces adapted to be inserted between the front and rear coupling members of a frame connected strut arm and a pair of opposed intermediary lugs projecting from a front axle of a four wheel drive vehicle to maintain the axle in positive caster alignment. The bushing has spaced side webs arranged to engage the exterior sides of the coupling members and prevent the bushing from sliding out of the members.

15 Claims, 2 Drawing Sheets

AXLE ALIGNMENT BUSHING

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to bushings in general and, more particularly to C-shaped bushings for a front axle strut arm coupling in a four wheel drive vehicle.

2. Description of the Prior Art

In some of the early off-road, four wheel drive vehicles, especially the Ford F150 and the Bronco, the front axle in the front suspension tended to wander when the wheels are on a grooved highway and change lanes. Furthermore, in an emergency stop the wheels will not hold straight and cause the vehicle to veer all over the road. This occurs most when the wear and tear on the axle system inevitably produces a negative caster in the front axle steering mechanism and a "caster shimmy" develops. "Negative caster" also will cause the tires to follow cracks in the road and when rounding a corner may not return the steering wheel to normal position.

The caster may be defined by the relative position of the front axle ball joints. When the upper ball joint is forward of the lower ball joint the caster is negative. Likewise, when the upper ball joint is to the rear of the lower ball joint the caster is positive.

The early stock Broncos, for example, is factory equipped with a rubber bushing inserted between the front and rear strut arm coupling members and the intermediary front and rear lugs projecting from the front axle. The rubber bushing was designed to take vibration and off-road shock loads off of the strut arm coupling and maintain positive caster in the axle. The constant wear and aging process tended to erode the rubber bushing and eventually it would slip sideways and out of the coupling members. The consequence of this action was to cause the axle to rotate forward into a negative caster.

The present invention provides novel features that adequately solves the problems inherent in the early Bronco and F150 vehicles which will not only maintain the front axle in positive caster alignment, but will also absolutely not slip out of the strut arm coupling under adverse road conditions.

SUMMARY OF THE PRESENT INVENTION

In carrying out the principles of the present invention in accordance with a preferred embodiment thereof, a strut arm bushing is developed for obtaining positive caster alignment in a vehicular front axle. The bushing comprises a C-shape plastic body for an efficient and effective insert between the front and rear strut arm coupling members and an intermediary pair of opposed front and rear lugs having upper and lower surfaces projecting from the axle. The body includes an opposed pair of first and second transverse walls tapering longitudinally in thickness from an open end to a point adjacent the closed end of the body. The walls also have inner and outer surfaces formed to mesh with the enclosed surfaces of the coupling members and axle lugs arranged to apply pressure therein and maintain the axle in positive caster alignment. A pair of spaced side walls are connected to the C-shaped edges which provide the means to support the body securely within the coupling members.

DETAILED DESCRIPTION OF THE PRESENT INVENTION

Figure 1:
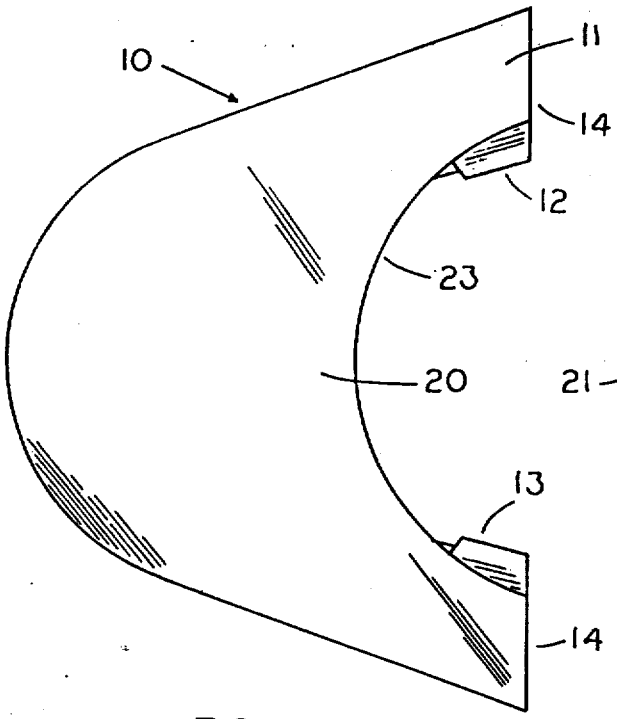
FIG. 1 is a side elevation view of a preferred embodiment showing the strut arm bushing of the present invention.
Figure 2:
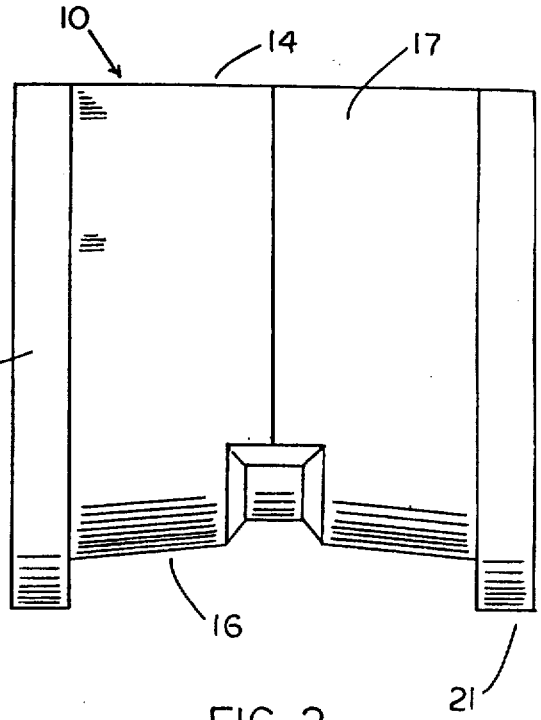
FIG. 2 is a top plan view of FIG. 1
Figure 3:
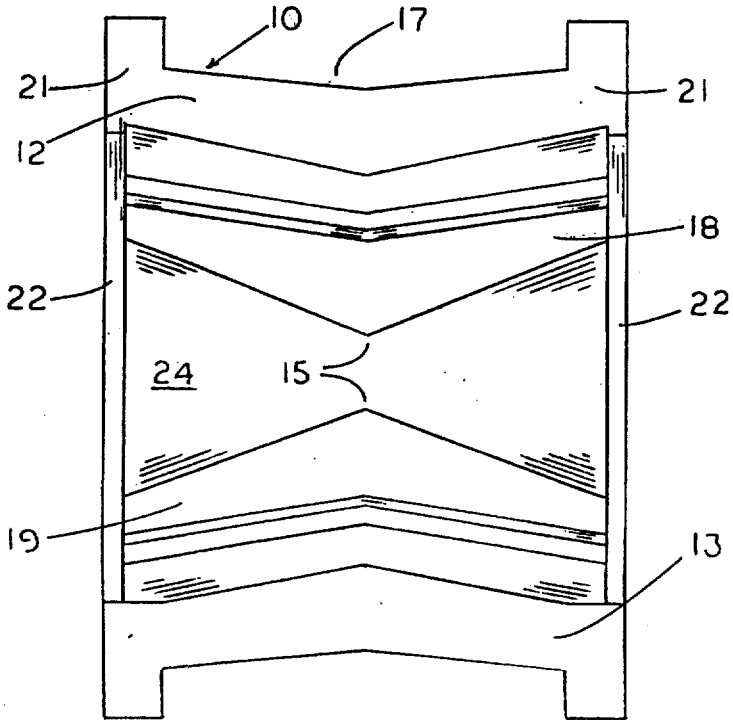
FIG. 3 is a front elevation view of FIG. 1 showing the spaced walls and interior space arranged to receive the opposed axle lugs.
Figure 4:
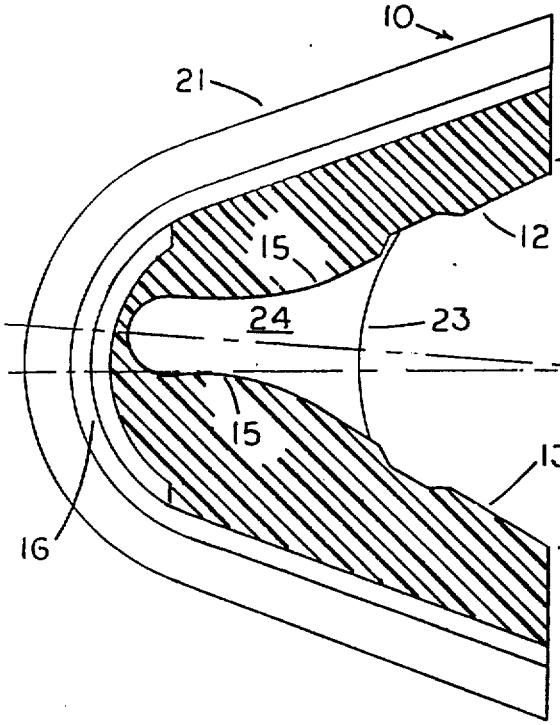
FIG. 4 is a right hand sectional view in the direction of a vertical plane passing through the center of Fig. 3, of the bushing as it would be inserted in the strut arm from coupling member.
Figure 5:
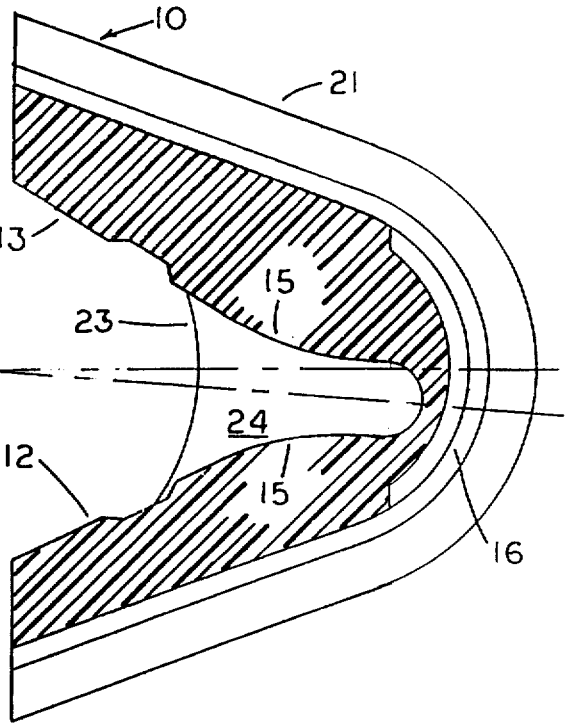
FIG. 5 is a left hand sectional view of FIG. 3 in an inverted position of the strut bushing as it would be inserted in the rear coupling member.
Figure 6:
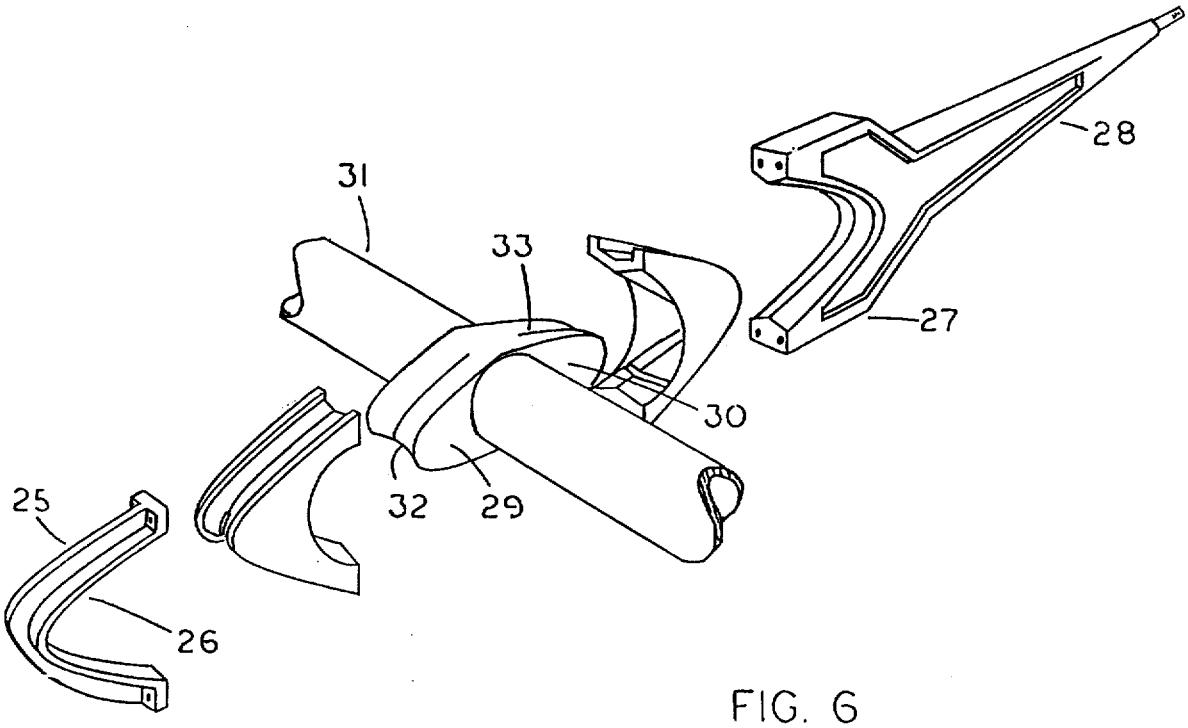
FIG. 6 is an exploded prospective view of a portion of the front axle assembly showing the relationship of the strut arm coupling members, bushings, and axle lugs.

Referring to [FIGS. 4 and 5] *the drawings* it can be seen that the strut arm bushing 10 includes a C-shape body 11 consisting of a transverse first wall 12 and a second wall 13. *Such body can be molded of a polyester material.* Walls 12 and 13 are tapered from an open end 14 of body 11 longitudinally for a distance of approximately ⅓ of the length to the closed end 16. At the ⅓ point 15 of length walls 12 and 13 merge together into the thinner end wall 16. Walls 12 and 13 have essentially V-shape cross-sectional areas formed by the parallel sides of body 11 including outer surface 17 and inner surface 18 of wall 12 and surface 19 of wall 13. The outer and inner surfaces form vertices midway between the sides of body 11. The depth of the vertices and walls vary from a first thickness at open end 14 to a maximum second thickness at 15 which point the thickness of the second wall is greater than that of the first wall. It has been found experimentally that the optimum wall thickness for wall 12 and 13 is approximately 9/16 of an inch at the open end and 11/16 of an inch at the ⅓ point 15 for the first wall and 5/8 of an inch and 1 inch respectively for the second. It has also been found from road tests that given the above wall dimensions bushing 10 will produce a positive caster from about 1° positive to about 5° positive caster depending upon the age, condition, and wear of the front axle supporting equipment. For example, if the axle is rated at 2° negative caster and a complete overhaul of supporting equipment is not made, the insertion of bushing 10 to replace the conventional rubber bushing will result in a 1° to 2° positive caster. On the other hand, if new front springs, the rear end of the strut arm re-bushed and the like type of repairs are made, it is possible to obtain 3° to 5° positive caster.

In addition to walls 12 and 13, body 11 has a pair of side webs 20 which provide a rim portion 21 and side portion 22. The heavier rim portion 21 extends approximately ⅜ of an inch above outer surface 17 of body 11 and is adapted to engage the outer side edges of the strut arm coupling members when inserted therein, and prevent bushing 10 from slipping sideways out of the coupling. The function of the coupling member will be discussed in more detail later. The side portion 22 of web 20 covers the interior space 23 between walls 12 and 13 and has a front edge 24 which is shaped to engage and enclose the sides of the front axle. The tapered-like space 23 within body 11 is canted due to the variation in wall thickness of walls 12 and 13, and is tilted at an angle with a horizontal plane passing through the center of body 11. The manner in which the canted space 23 rotates the front axle to a positive caster will also be discussed later.

In operation, bushing 10 is inserted within the strut arm front coupling member 25 in which the outer surface 17 of body 11 is shaped to register with the inner surface of member 25. In this position the rim portion 21 of web 20 overlaps the outside edge 26 of member 25 such that bushing 10 can not be moved sideways and can only be inserted into the front of member 25. Likewise, the thicker wall 13 is disposed at the bottom and thinner wall 12 at the top of member 25. Upon inserting the bushing within member 27 connected to the coupling end of strut arm 28, bushing 10 is reversed such that the thicker wall 13 is disposed at the top of member 27 and thinner wall 12 at the bottom. As a consequence, interior space 23 is canted forwardly in an upwardly direction. Therefore, when members 25 and 26 are brought together to engage the opposed tapered lugs 29 and 30 projecting from front axle 31 the tilted space 23 in body 11 causes wall 13 to push up on the lower surface 32 of front axle lug 29 and, on the opposite side of axle 31, wall 12 to push down on the upper surface 33 of rear lug 30. The closing pressure of the coupling members provide a combined torque load on lugs 29 and 30 causing axle 31 to rotate upward in a positive caster direction.

The front axle caster today in most stock Bronco and F150 vehicles is neutral or around 1° negative. In normal off-road service the wear and tear on the axle assembly have reduced the caster on most to a negative state. The popular trend to raise the height of the body tend to institute even a larger negative caster. Some attempts are made to correct for this by resorting to such things as steering stabilizers to control the so-called "caster shimmy" with little or no effect. The replacement of the conventional rubber bushing for the strut arm coupling members with bushing 10 described above has proven highly successful in eliminating "caster shimmy" and controlling the front axle caster to a positive position.

From the description and illustration of the present invention, it is obvious that it provides many important advantages for obtaining effective steering control on the early Bronco and F150 vehicles.

The foregoing description is to be clearly understood to be given by way of illustration and example only, the spirit and scope of the present invention being limited solely by the appended claims.

I claim:

1. A strut arm coupling bushing adapted to maintain optimum alignment of a vehicular front axle comprising a C-shaped body formed for a bushing insert between front and rear members of a coupling and an intermediary pair of opposed front and rear lugs with top and bottom surfaces projecting from the axle, the body having opposed first and second transverse walls tapering longitudinally in thickness from an open end to a point adjacent a closed end of said body, including inner and outer surfaces for meshing with the enclosed surfaces of the members and the axle lugs and to apply pressure therein to maintain said axle in alignment, and further including spaced side webs connected to C-shaped edges of the walls having a rim portion extending above the outer surfaces adjacent to the C-shaped edges for engagement with the outer sides of said members so as to retain said body securely within said members, the rim further merging into a thinner side web portion having a front edge formed into an arc of a circle adjacent to the open end of said body for contact with said axle beside said lugs.

2. A bushing as set forth in claim 1, wherein the cross-sectional area of said walls is defined by parallel sides and the inner and outer transverse surfaces which form elongated V-shaped vertices disposed midway between the sides, and said walls vary longitudinally in thickness from a first thickness at the open end to a second thickness at a point approximately ⅓ of the length from open to closed ends of said body at which point said walls merge together into a uniformly thick, arcuately shaped, transverse end wall.

3. A bushing as set forth in claim 1, wherein the overall thickness of the second wall is greater than that of the first wall and when said body is inserted within said front member said second wall exerts an upward pressure on the front lug and similarly, when inserted in reverse order within said rear member said second wall exerts a downward pressure on said rear lug wherein the combined pressure rotates said axle to a positive caster setting.

4. A bushing as set forth in claim 1, wherein said body is constructed of a durable plastic material.

5. A strut arm coupling bushing adapted to maintain a vehicular front axle in positive alignment comprising a C-shaped formed body having spaced first and second transverse walls for inserting within a front and rear coupling member and mesh with the upper and lower surfaces of a pair of opposed front and rear tapered lugs projecting from the axle, the walls being tapered longitudinally and having a maximum wall thickness at approximately ⅓ wall length from an open to closed end of said body, said walls further having an outer surface for intimate registry with an inner surface of the coupling members and an inner surface with the outer surfaces of the front and rear lugs for applying pressure thereon to maintain said axle in positive alignment, including spaced side webs connected to C-shaped edges of said walls for securing said body within said members, the side webs including a rim portion projecting above the outer surface of said walls adapted to enclose the outer side edges of said members and prevent said body from slipping sideways out of the coupled members, and further including said side webs substantially thinner than the rim portions and having arcuate shaped front edges at the open end for engaging said axle adjacent to the opposite sides of said lugs enclosed within said members.

6. A bushing as set forth in claim 5, wherein said walls have a transverse cross-sectional area defined by spaced parallel sides and spaced inner and outer wall surfaces tapering into V-shaped vertices disposed in a vertical plane passing longitudinally through the center of said body, and said walls vary from a first thickness at the open end to a second greater thickness at ⅓ of the distance from said open end to the closed end of said body at which point the overall thickness of said wall is greater than that of said first wall and said walls merge together into a transverse, arcuately shaped end wall of uniform thickness.

7. A bushing as set forth in claim 5, wherein the difference in wall thickness between said first and second walls provide an interior space canted at an angle to a horizontal plane passing through the center of said body such that when said body is inserted within said front member said second wall exerts an upward pressure on said lower surface of said front lug and similarly when inserted in reverse position within said rear member said second wall exerts a downward pressure on said upper surface of said rear lug, and the combined torque load on said lugs move said axle in an upward rotation to a positive caster.

8. A bushing as set forth in claim 5, wherein said thickness of said first wall is approximately 9/16 of an inch at said open end and 11/16 of an inch at the ⅓ point of wall length and the corresponding thickness of said second wall is approximately 5/8 of an inch and 1 inch, respectively.

9. A bushing as set forth in claim 5, wherein the caster will vary from approximately 2° to 5° positive caster depending upon the condition and wear and tear of the relative elements connected to said front axle.

10. A bushing as set forth in claim 5, wherein said body is moulded of a polyester material in substantially riged form adapted to exert a constant torque load on said axle.

*11. In a vehicle suspension structure including an axle twistable for adjusting the alignment of the suspension structure, a lug projecting generally radially from the axle and a coupling member leaving a concave interior surface for embracing the lug circumferentially of the axle, the improvement comprising an insert fittable over the lug and into registration with the concave interior surface of the coupling member for being clamped between the lug and the coupling member, said insert being shaped for applying force to said lug generally circumferentially of the axle as the coupling member is moved over said insert and said insert is moved over the lug to twist the axle and thereby adjust the vehicle suspension structure.*

*12. In a vehicle suspension structure including an axle having a generally radially elongated, generally horizontally projecting lug with top and bottom surfaces, and a coupling member having a concave interior surface including having a top surface for overlying the top surface of the lug and a bottom surface for underlying the bottom surface of the lug, the improvement comprising an insert fittable over the lug and into registration with the concave interior surface of the coupling member for being clamped between the lug and the coupling member, said insert having top and bottom branches of different thicknesses, respectively, for applying differential forces to the lug as the coupling member and the axle are moved relative to clamp said insert for twisting the axle relative to the coupling member and thereby adjusting the vehicle suspension structure.*

*13. In a vehicle suspension structure including an axle having an elongated, generally radially projecting lug and a coupling member having a concave interior surface for receiving the lug, the improvement comprising an insert fittable into the coupling member and having an elongated interior cavity for receiving the elongated lug, the length of said insert cavity being canted relative to the length of the coupling member concave interior surface when said insert is fitted in the coupling member for applying force to the lug in a direction circumferentially of the axle by moving the coupling member and said insert toward the axle over the lug which force twists the axle relative to the coupling member.*

*14. The method of adjusting a vehicle suspension structure of the type including an axle having a generally radially elongated, generally horizontally projecting lug with top and bottom surfaces and a coupling member having a top surface for overlying the top surface of the lug and a bottom surface for underlying the bottom surface of the lug, which method comprises placing between the lug and the coupling an insert having top and bottom branches of respectively different thicknesses, and moving the coupling and the lug together and to force the thicker branch of the insert against the lug for twisting the axle relative to the coupling member to adjust the suspension structure.*

*15. The method of adjusting the alignment of a vehicle suspension structure of the type including an axle having a generally radially elongated lug, and a coupling member having a concave interior surface for receiving the lug, which method comprises placing between the lug and the pocket of the coupling member an insert having an elongated interior cavity for receiving the elongated lug which cavity is canted relative to the coupling member concave interior surface, and thereafter moving the coupling member and the lug together to clamp the insert therebetween and thereby applying twisting force to the axle by urging the lug into alignment with the canted insert cavity to adjust the vehicle suspension structure.*

* * * * *

UNITED STATES PATENT AND TRADEMARK OFFICE

CERTIFICATE OF CORRECTION

PATENT NO. : Re. 32,774

DATED : November 1, 1988

INVENTOR(S) : James M. Duff

It is certified that error appears in the above-identified patent and that said Letters Patent are hereby corrected as shown below:

Column 5, line 25: "riged" should be ...rigid...

Column 5, line 44: "having" should be deleted.

Column 6, line 5: "relative" should be ...relatively...

Column 6, line 7: "adjusting" should be ...adjust...

Column 6, line 39: "pocket" should be ...concave interior surface...

Column 6, line 44: "applying" should be ...apply...

Signed and Sealed this

Fourth Day of April, 1989

*Attest:*

*Attesting Officer*

DONALD J. QUIGG

*Commissioner of Patents and Trademarks*

Disclaimer and Dedication

Re. 32,774.—*James M. Duff*, Sequim, Wash. AXLE ALIGNMENT BUSHING. Patent dated Nov. 1, 1988. Disclaimer and Dedication filed Feb. 21, 1989, by the *inventor*.

Hereby disclaims and dedicates to the Public the remaining term of said patent.

[*Official Gazette April 18, 1989.*]